United States Patent [19]

Arai et al.

[11] 4,082,132

[45] Apr. 4, 1978

[54] LOW SECTION PROFILE PNEUMATIC RADIAL TIRE FOR HEAVY VEHICLES

[75] Inventors: Tatsuo Arai, Fuchu; Hironori Hirano, Akigawa; Hiroyuki Kajimura, Higashi-Murayama; Masayuki Matsui, Kodaira, all of Japan

[73] Assignee: Bridgestone Tire Company Limited, Kyobashi, Japan

[21] Appl. No.: 729,240

[22] Filed: Oct. 4, 1976

[30] Foreign Application Priority Data

Oct. 2, 1975 Japan ................................ 50-118234

[51] Int. Cl.$^2$ ................................................ B60C 9/18

[52] U.S. Cl. ................................ 152/361 R; 152/374

[58] Field of Search ..... 152/361 R, 361 FP, 361 DM, 152/360, 354, 374

[56] References Cited

U.S. PATENT DOCUMENTS

| | | | |
|---|---|---|---|
| 3,481,385 | 12/1969 | Depmeyer et al. | 152/361 R |
| 3,512,568 | 5/1970 | DeLobelle | 152/361 R |
| 3,598,165 | 8/1971 | Hanus | 152/361 R |
| 3,799,233 | 3/1974 | Cappa | 152/361 R |

*Primary Examiner*—Robert B. Reeves

*Assistant Examiner*—Charles A. Marmor

*Attorney, Agent, or Firm*—Sughrue, Rothwell, Mion, Zinn and Macpeak

[57] ABSTRACT

A low section profile pneumatic radial tire for heavy vehicles used for recently developed transport facilities such as a trolley bus, mono-rail vehicle, driverless vehicle, sub-way vehicle, etc. is disclosed. The low section profile pneumatic radial tire for heavy vehicles is constructed to satisfy the following three conditions, i.e.

1. a thickness G*m* of that tread portion which extends along a crown center region SW2 is substantially uniformly distributed over 35–60% of the maximum width SW1 of those inextensible layers which mainly consist of a tension member of a belt,
2. a cushion rubber formed of a rubber stock which is triangular in cross-section and has a thickness G*s* is arranged outside both sides of the center region of a crown and inserted between a carcass and a belt so as to gradually increase the thickness of the tread portion toward the hump portion of the tire, and
3. the above mentioned thickness G*s* of the cushion rubber is limited to a range of 25–50%, preferably 30–45% of the thickness G*c* of that tread portion which is located at the crown center position.

5 Claims, 7 Drawing Figures

FIG_1

PRIOR ART

SW
4"
4
1
6b
6c
GB
6
6a
Gc
8
5"
5
7
2
H
S
3

FIG_3
SW
SW1
SW2
6c'
4
6
1
Gm
GB
Gc
GS
6a
6b
6c
5
8
7
Radius of Curvature of Crown
2
H
S
3

LOW SECTION PROFILE PNEUMATIC RADIAL TIRE FOR HEAVY VEHICLES

This invention relates to low section profile pneumatic radial tires for heavy vehicles and more particularly to the kind of pneumatic tire having a large load carrying capacity. These tires are constructed to greatly reduce any objectionable generation of heat and effectively prevent separation failure induced between belt layers as well as uneven wear of a tread of the tire.

Radial tires shall be understood to mean all kinds of tires in which a radial carcass formed by plies, a number of cords of which lie in substantially radial planes or a semi-radial carcass formed by plies or laminated layers of such plies. A number of cords are inclined at an angle of about 10° with respect to the radial planes are reinforced by a belt superimposed about the carcass and formed by laminated inextensible layers and a number of cords, particularly, metal wire cords lie in substantially peripheral direction of the tire.

In accordance with the present invention, an improved tread construction is provided which can suitably reinforce the belt such that durability of a low section profile pneumatic radial tire to be used for vehicles of the heavy duty type is improved. Such a low section profile pneumatic radial tire possesses the above mentioned reinforcing construction and at the same has a crown flatness of larger than 2.0 and an aspect ratio of smaller than 0.85.

The crown flatness is defined by R/S where R is a radius of curvature of the outer surface of the tread crown in equatorial sectional plane which contains the above mentioned belt extending in widthwise direction and S is the maximum width of the tire given by a dimension between side wall portions of the tire.

The aspect ratio is defined by H/S where H is a height of tire, that is, a vertical distance from a reference line connecting two bead heels of the tire and extending in parallel with an axial line of the tire to the outer surface of the tread crown.

In general, a radial tire which makes use of metal cords as the reinforcing material of the belt will have a rigid tread and hence is possessed of a number of excellent characteristics such as improved resistance to wear and puncture under service conditions, etc. These advantages of the radial tire have led to various types of utilization. Particularly, this kind of radial tire has recently been applied to a trailer and other recently developed transport facilities such as a trolley bus, a monorail vehicle, a driverless vehicle, a subway vehicle, etc.

The radial tire used for such novel transport facilities is required to have not only a high load carrying capacity but also a small aspect ratio H/S. This is because of the fact that the radial tire for the novel transport facilities is required to reduce its outer diameter to reduce a height of the vehicle. The maximum height of the vehicle measured from the road surface on which the vehicle travels is lowered for the purpose of decreasing the installation cost for a platform, wiring works, etc. and also decreasing the working cost for excavating a tunnel.

Radial tires for trucks in general, a light truck or heavy vehicles such as large construction vehicles have an aspect ratio H/S of the order of substantially 1.0. Low section profile tires and particularly a low section profile radial tire for heavy vehicles could not exhibit its characteristic features inherent thereto even though its aspect ratio is decreased to substantially 0.7 to 0.8, provided that the tread portion, particularly the belt is reinforced by the same arrangement as that applied to the conventional tire having the aspect ratio $H/S \approx 1$.

An object of the invention, therefore, is to provide a low section profile pneumatic tire for heavy vehicles, which is improved over the conventional tire construction described hereinabove.

Another object of the invention is to provide a low section profile pneumatic tire for heavy vehicles having an aspect ratio of smaller than 0.85 and a crown flatness of larger than 2.0, which features and employs a novel tread portion whose thickness is correctly allotted in the widthwise direction of the crown and a novel arrangement of the belt.

A further object of the invention is to provide a low section profile pneumatic tire for heavy vehicles, which can effectively prevent occurrence of a separation failure induced in the belt and an uneven wear of the tread rubber under service conditions.

A feature of the invention is the provision of a low section profile radial tire for heavy vehicles the cross-sectional configuration defined in a metal mold of which has an aspect ratio of smaller than 0.85 and a crown flatness of larger than 2.0 and which comprises a carcass formed by plies. A number of cords lie in substantially the radial plane or inclined at a very small angle with respect to the radial plane and a belt formed by a plurality of inextensible layers and superimposed about the carcass and extending over substantially total width of a crown of a tread portion of the tire. The tire is constructed to satisfy the following three conditions, i.e.

1. the thickness $Gm$ of that tread portion which extends along the crown center region SW2 is substantially uniformly distributed over 35–60% of the maximum width SW1 of those inextensible layers which mainly consist of a tension member of the belt,
2. a cushion rubber formed of a rubber stock which is triangular in cross-section and has a thickness $Gs$ is arranged outside both sides of the center region of the crown and inserted between the carcass and the belt so as to gradually increase the thickness of the tread portion toward the hump portion of the tire, and
3. the above mentioned thickness $Gs$ of the cushion rubber is limited to a range of 25–50% of the thickness $Gc$ of that tread portion which is located at the crown center position.

The invention will now be described in greater detail with reference to the accompanying drawings, wherein.

Figure 6:
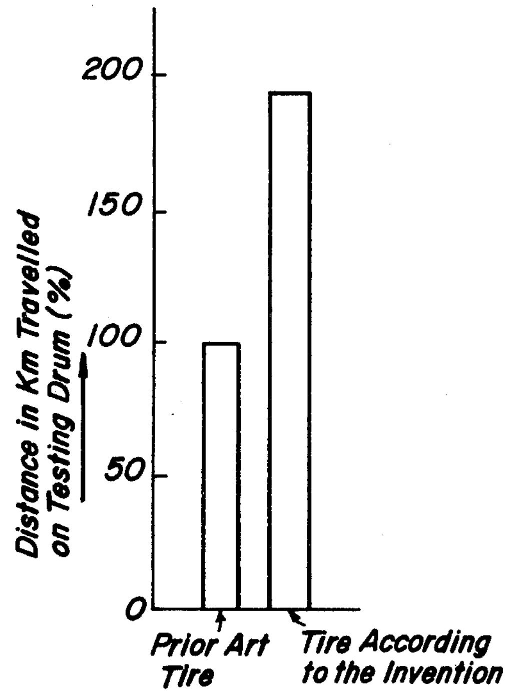
Figure 7:
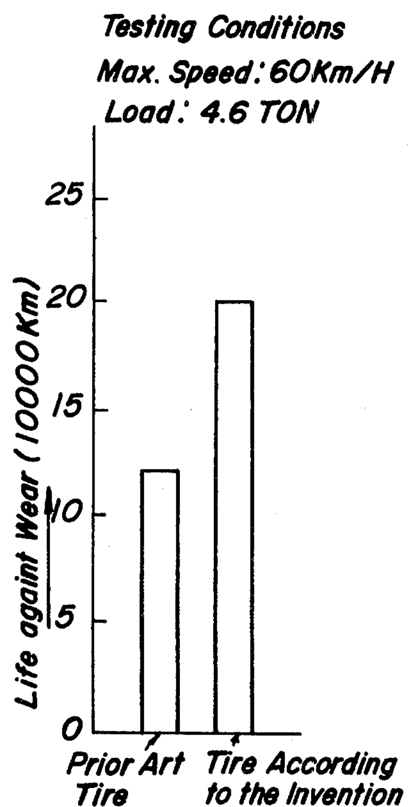

FIG. 6 is a graph showing comparison between the distance travelled on a testing drum by the conventional tire and the distance travelled on the testing drum by the tire according to the invention when the tires are subjected to the drum test; and FIG. 7 is a graph showing comparison between the life against wear of the conventional tire and the life against wear of the tire according to the invention.

Figure 1:
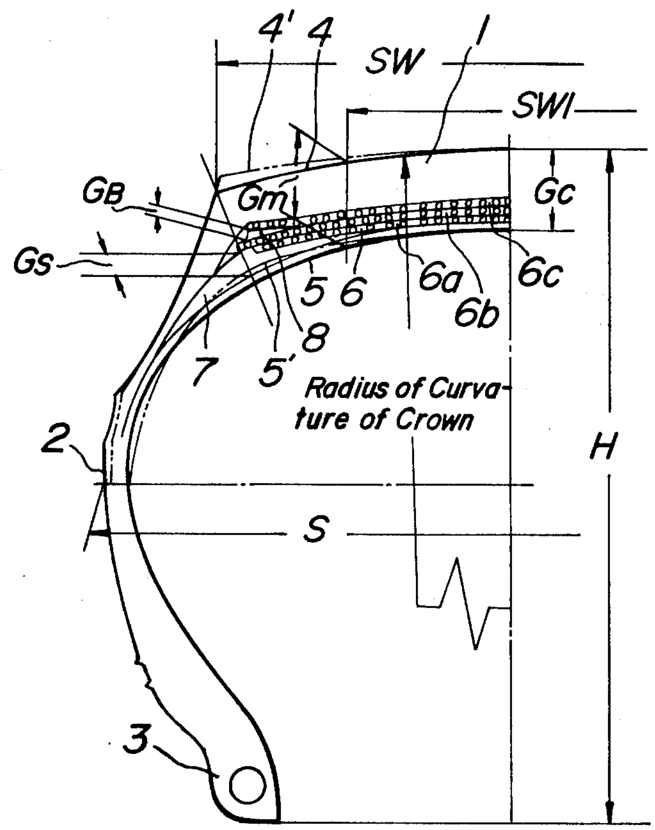
FIG. 1 is a cross-sectional view of one-half of a prior art low section profile pneumatic radial tire showing essential parts thereof.

In FIG. 1 is shown one-half of a prior art radial tire in the equatorial sectional plane which is defined by a metal mold and constructed to decrease its aspect ratio H/S to 0.8. Reference numeral 1 designates a tread portion, 2 a side wall portion, 3 a bead portion, 4 an outer surface of the tread portion 1, that is, a crown, 4' a deformed crown displaced when the tire is removed out of the metal mold and united with a wheel rim and then inflated by applying a normal internal pressure into the tire, 5 a carcass before deformation, 5' a carcass after deformation, 6 a belt formed of three inextensible layers *6a, 6b* and *6c,* the layers *6b, 6c* including a cord arrangement which constitutes a main body of a tension member, 7 a cushion rubber and 8 an interlayer sheet rubber.

The inextensible layer *6a* contains cords inclined at an angle of 67°, for example, in one direction with respect to the equatorial line of the tire for the purpose of alleviating a difference between the cord angle of the ply cords of the carcass 1 and the cord angle of the cords of the belt 6. The inextensible layer *6b* contains cords inclined at an angle of 17°, for example, in the same direction as the cords in the inextensible layer *6a* and the inextensible layer *6c* contains cords inclined at an angle of 17°, for example, in a direction opposite to the direction of the cords in the inextensible layer *6b.* These three inextensible layers *6a, 6b* and *6c* are superimposed one upon the other and hence play a role of operating as the main body of the tension member.

If the tire having the prior art tread portion reinforcing arrangement and the sectional configuration defined by the metal mold as shown by a full line in FIG. 1 is united with the wheel rim and then inflated by applying a normal internal pressure, the carcass 5 becomes deformed into a configuration shown by dot-dash lines 5' which is balanced with the applied internal pressure. As a result, that radius of curvature of the tire which is located near the shoulder portion is locally increased thus displacing the crown 4 of the tread portion 1 from the full line position to a dot-dash line position 4'. Further, as a result, the interlayer sheet rubber 8 sandwiched between the ends of the inextensible layers *6b, 6c* constituting the main body of the tension member of the belt 6 and containing the cords oppositely inclined at a small angle with respect to the equatorial line of the tire is subjected to a large shearing strain in circumferential direction thereby inducing a separation failure which is vital to the low section profile pneumatic radial tire for heavy vehicles.

Figure 2:
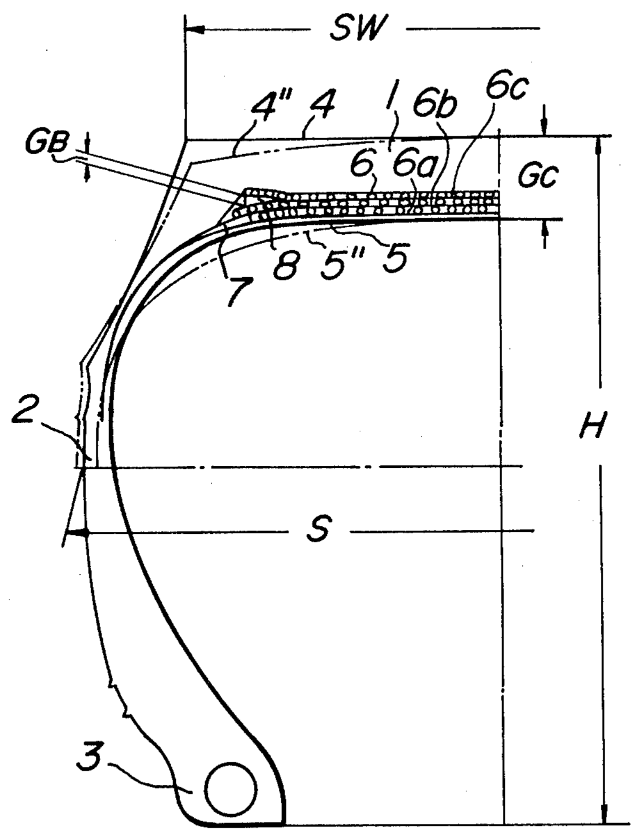
FIG. 2 is a cross-sectional view of one-half of another prior art low section profile pneumatic radial tire showing essential parts thereof.

As shown in FIG. 2, attempts have been made to make the radius of curvature of both the crown 4 and the belt 6 in the sectional configuration of the tire defined by the metal mold infinitely large so as to project the carcass 5 outwardly in the radial direction from the balanced configuration near the both ends of the belt 6 taken when the tire is inflated. In this case, the carcass 5 becomes displaced toward a balanced shape shown by dot-dash lines 5'' when the tire is inflated. Attempts have also been made to utilize such displacement of the carcass 5 for the purpose of alleviating the above mentioned shearing strain and at the same time to make the thickness of the tread portion 1 in its widthwise direction the same as that thickness G*c* of the crown center position which is inclusive of the carcass 2 and measured in a direction perpendicular to the surface of the crown 4 for the purpose of preventing generation of heat of the tire as shown in FIG. 2. In this conventional tire, the radius of curvature of the crown 4 decreases as shown by dot-dash lines 4'' when the tire is inflated. Hence, if a slight off-center is involved in the arrangement of the belt 6, the radius of curvature of the crown 4 becomes considerably irregular on the periphery of the tire in its widthwise direction. As a result, irregular wear, which hereinafter will be called uneven wear, is produced to extremely decrease the life against wear of the tire.

Figure 3:
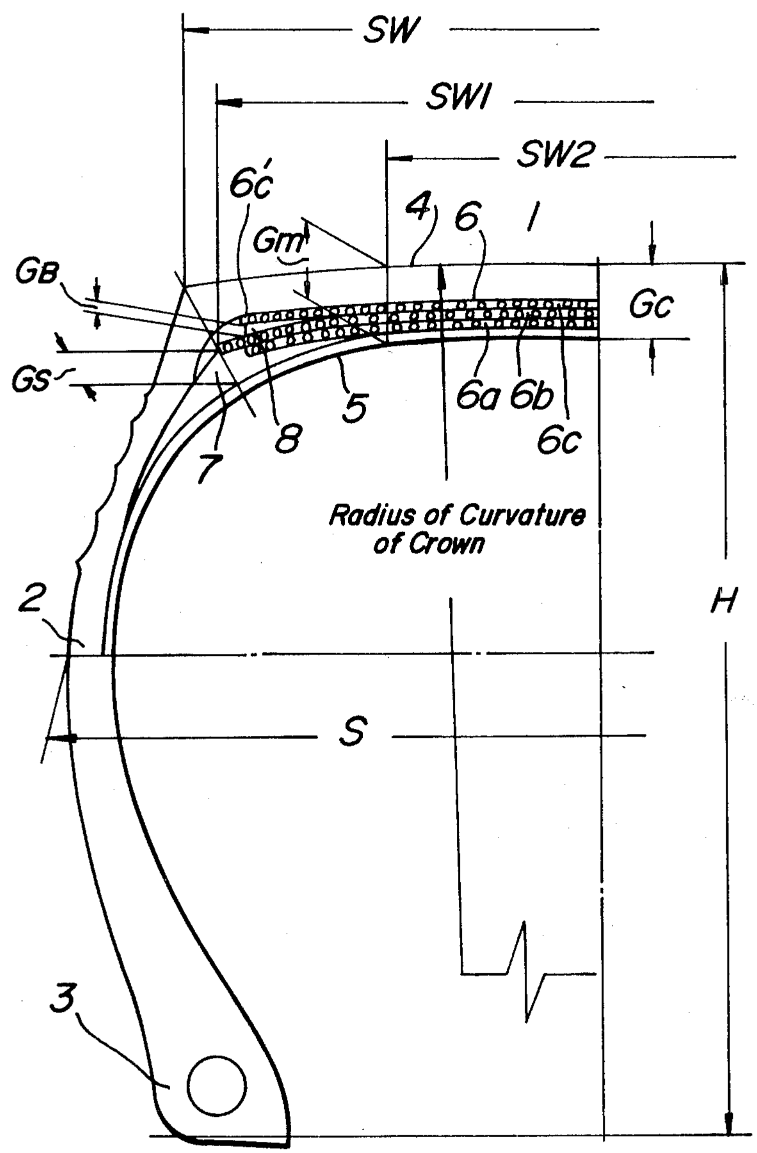
FIG. 3 is a cross-sectional view of one-half of a low section profile pneumatic radial tire according to the invention showing essential parts thereof.

In FIG. 3 is shown a cross-section of one-half of a tire to be tested having a size of 14.00 R 16 according to the invention. The cross-section of the tire of the present embodiment defined in a vulcanizing mold has an aspect ratio H/S = 0.8 and a crown flatness R/S = 3.0. The tire is inflated by applying a normal internal pressure of 9.0 Kg/cm$^2$ and use is made of a wheel rim 10.00 WI.

The crown is particularly important with respect to the wear resistant property of a low section profile pneumatic radial tire for heavy vehicles having an aspect ratio H/S of about 0.8 and a large load carrying capacity. It has been found out by experimental tests on various crown configurations that good are obtained when the radius of curvature of the crown defined in the metal mold is not subjected substantially any change when the tire is united with the wheel rim and pressurized and also when the crown flatness is at least 2.0, preferably in a range of 2.5 to 5.0.

If the crown flatness is smaller than 2.0, the crown width SW becomes wide, so that uniformity of the contact pressure of the tire in the widthwise direction thereof with the road surface is degraded whereby uneven wear could not effectively be prevented.

The durability of the tire depends particularly on the construction and arrangement of the belt. Particularly, the heat generating property causes a separation failure to occur between the inextensible laminated layers constituting the main body of the tension member of the belt and inclined at a small angle with respect to the equatorial line of the tire. The fact that the heat generating property of the tire is important for the durability thereof per se has been well known in the art.

With respect to this point, the inventors have paid attention to distribution of the thickness of the tread portion and found out by experimental tests that it is necessary to arrange two inextensible layers containing cords extending along two directions symmetrically inclined at a small angle with respect to the equatorial line along a width of 35–60%, preferably 45–55% of the maximum width SW1 of these two inextensible layers and to make the thickness G*m* of that tread portion which is located along the crown center region substantially equal to the thickness G*c* of that tread portion which lies in the crown center position.

This is because of the fact that the tension produced when the tire is inflated by applying the internal pressure into the tire is really subjected to those inextensible layers (ordinary two layers) containing cords inclined at a small angle with respect to the equatorial line at the crown center region, and if the width of these inextensible layers is narrower than 35% of the maximum width SW1 thereof, the thickness of rubber at the shoulder portion becomes larger thus tending to generate heat and at the same time the radius of curvature of the shoulder portion is increased when the tire is inflated thus producing shearing strain at the ends of the belt.

However, if the width of the inextensible layers exceeds 60% of the maximum width SW1 thereof, the radius of curvature of the shoulder portion becomes decreased as in the conventional tire shown in FIG. 2 when the tire is inflated thus producing also shearing strain at the ends of the belt.

As described above, the shearing strain produced at the outside regions exclusive of the crown center region of the conventional tire shown in FIG. 1 and the uneven wear produced in the outside regions exclusive of the crown center region of the conventional tire shown in FIG. 2 are mainly due to the deformation of the inner surface-shape of the carcass 5 when these conventional tires are inflated. The inventors, therefore, have found out that it is advantageous to prevent such deformation of the inner surface-shape of the carcass produced when the tire is inflated. In order to attain such object, a number of experimental tests have been performed on the arrangement of each inextensible layer of the belt and means for supporting these inextensible layers. The experimental tests have produced the surprising result that the deformation of the inner surface-shape of the carcass produced when the tire is inflated can sufficiently be prevented if a cushion rubber 7 formed of a rubber stock which is triangular in cross-section and is inserted between the carcass 5 and the belt 6, a thickness $Gs$. That is, a relatively thick portion of the cushion rubber 7 is measured at near a hump portion of tire along a normal line drawn perpendicular to the carcass 5, and the thickness $Gs$ is limited to 25–50%, preferably 30–45% of the thickness $Gc$ of that tread portion which is located at the crown center position.

If the thickness $Gs$ of the cushion rubber 7 is smaller than 25% of the thickness $Gc$ of the tread portion, the tire is subjected to the uneven wear as in the conventional tire shown in FIG. 2, while if the thickness $Gs$ of the cushion rubber 7 exceeds 50% of the thickness $Gc$ of the tread portion, the tire is subjected to shearing strain as in the conventional tire shown in FIG. 1.

The thickness $Gs$ of the cushion rubber 7 is defined by a distance from the end of the inextensible layer having the maximum width of the carcass 5, the distance being measured on a normal line which is drawn from the end of the inextensible layer having the maximum width perpendicular to the carcass ply 5. It is a matter of course that the thickness $Gs$ of the cushion rubber 7 is exclusive of the thickness of the coating rubber of both the carcass 5 and the belt 6 adjacent to the cushion rubber 7.

The thickness and configuration of the cushion rubber 7 must be determined such that the thickness of the tread portion is gradually increased from the crown center region to the hump portion.

It is preferable that the cushion rubber 7 have a hardness which is lower than that of the tread rubber and the coating rubber of the carcass and belt and that the cushion rubber 7 have a heat resistant property and shock absorbing property which are superior to those of the tread rubber and the coating rubber of the carcass and belt. Alternatively, the cushion rubber 7 may be formed of the same rubber as the tread rubber and the coating rubber of the carcass and belt.

Figure 4:
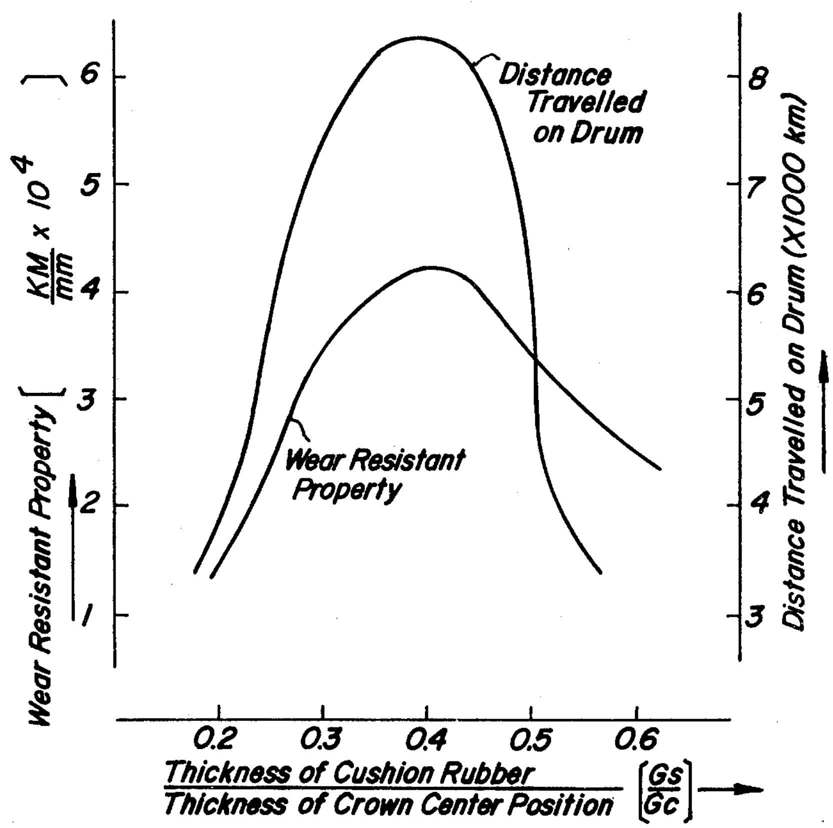
FIG. 4 is a graph showing a plot of a test result of tire wear resistant property and distance travelled on drum as against a function of a ratio of a thickness $Gs$ of a cushion rubber to a thickness $Gc$ of that tread portion which is located at the crown center position.

FIG. 4 is a graph illustrating a plot of the test result of tire wear resistant property and distance travelled on drum as against a function of a ratio of the thickness $Gs$ of the cushion rubber 7 to the thickness $Gc$ of that tread portion which is located at the crown center position.

As can be seen from FIG. 4, the ratio $Gs/Gc$ of 25–50%, in particular of 30–45% is effective to improve the wear resistant property and distance travelled on drum of the tire.

The above mentioned test was effected on a tire having a crown width SW of 270 mm, a tire height H of 289 mm, a tire maximum width S of 360 mm, and a radius of curvature of the crown 4 of 1,000 mm. The tire, therefore, has a crown flatness R/S of 2.78 and an aspect ratio H/S of 0.8.

The carcass 5 is formed by one layer, the steel cords of which have a twisted construction of $1\times3+5\times7+1$ and are inclined at an angle of 90° with respect to the equatorial line of the tire. The belt 6 makes use of steel cords having a twisted construction of $1\times3+5\times7+1$. The inextensible layer **6*a* contains cords inclined in one direction at an angle of 67° with respect to the equatorial line of the tire and has a width of 245 mm. The inextensible layer 6*b* contains cords inclined also in one direction at an angle of 17° with respect to the equatorial line of the tire and has a width of 265 mm. The inextensible layer 6*c*** contains cords inclined in opposite direction also at an angle of 17° and has a width of 245 mm.

The width SW2 of that region of the crown center region, in which the thickness $Gm$ of the tread portion is equal to $Gc=24.5$ mm, is 45% of the width SW1 of the inextensible layer **6*b*** having the maximum width of 265 mm, that is, 120 mm.

In addition, the thickness $Gs$ of the cushion rubber 7 is selected to 37% of the thickness $Gc$ of the tread portion which is located at the crown center position, that is, selected to 9 mm.

Between the inextensible layers **6*b* and 6*c* is sandwiched a sheet rubber 8 having a thickness $GB$ of 4 mm, the thickness $GB$ being exclusive of the thickness of the coating rubber of each of the inextensible layers 6*b*, 6*c***.

A tire to be tested having contours defined in the metal mold was constructed as shown in FIG. 3. It was found that even if the tire was united with the wheel rim and then pressurized by applying a normal internal pressure of 9 $Kg/cm^2$, both the carcass 5 and the crown 4 were not substantially deformed and the above described various dimensions were not varied.

Figure 5:
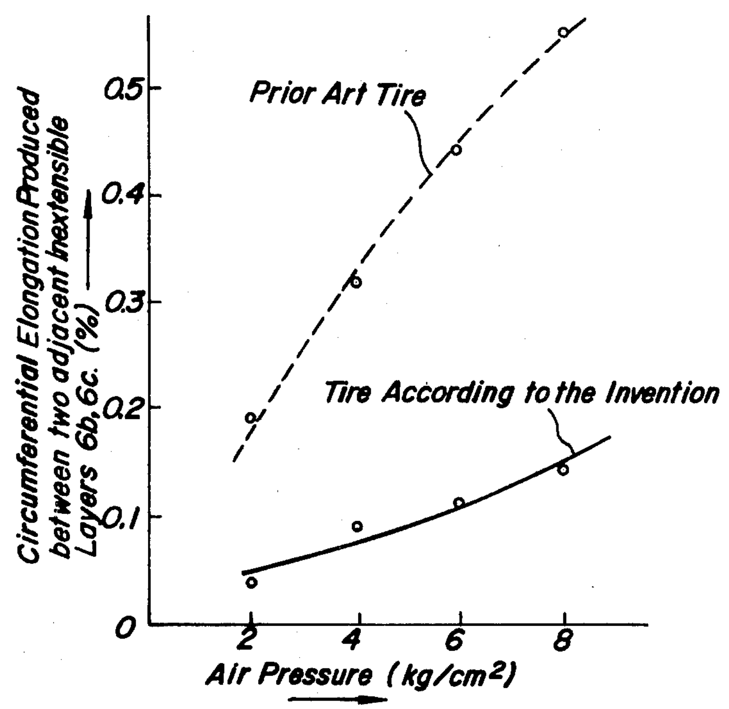
FIG. 5 is a graph showing a plot of a test result of circumferential elongation produced between two adjacent inextensible layers *6b, 6c* as against a function of an air pressure applied to a tire to be tested.

In FIG. 5 is shown a graph illustrating a plot of circumferential elongation produced between the two adjacent inextensible layers **6*b*, 6*c* as against a function of an air pressure applied to tires to be tested. This graph is based on data obtained from the conventional tire shown in FIG. 1 and the tire according to the invention shown in FIG. 3. Dimensions of the conventional tire shown in FIG. 1 are as follows. The radius of curvature R of the crown 4 defined by the vulcanizing metal mold is 800 mm, the maximum width of the tire is 360 mm, the thickness $Gc$ of that tread portion which is located at the crown center position is 24.0 mm, the thickness $Gs$ of the cushion rubber 7 is 13 mm, the thickness $Gm$ of the crown at SW2 is 30.5 mm and the maximum thickness $GB$ of the sheet rubber 8** is 2.5 mm.

As can be seen from FIG. 5, the circumferential elongation produced between the two adjacent inextensible layers **6*b*, 7*c*** of the tire according to the invention when it is inflated to an internal pressure of 9 $Kg/cm^2$ is far smaller than that produced in the conventional tire when it is inflated to the same internal pressure, whereby the separation between the two adjacent inextensible layers *6b*, *6c* of the belt 6 can effectively be prevented.

FIG. 6 is a graph illustrating the result obtained from a separation test effectuated with the aid of an indoor drum. Both the conventional tire and the tire according to the invention were pressurized by applying an internal pressure of 9 $Kg/cm^2$ and run on the indoor drum. As can be seen from FIG. 6, the distance in Km travelled by the tire according to the invention until failure occurs is about two times longer than that obtained by the conventional tire.

FIG. 7 is a graph illustrating the test result of the wear resistant property of the conventional tire and the tire according to the invention travelled on an ordinary paved road under conditions of the maximum running speed of 60 Km/h, average speed of 30–40 Km/h under load of 4,600 Kg and air pressure of 9 $Kg/cm^2$. As can be seen from FIG. 7, the tire according to the invention can significantly improve its life against wear if compared with that of the conventional tire.

As stated hereinbefore, the invention is capable of effectively prevent separation of belt and uneven wear of the tread rubber which have been encountered with the conventional low section profile pneumatic radial tire for heavy vehicles having a large load carrying capacity and hence of improving wear resistant property and characteristics of such kind of tire.

What is claimed is:

1. A low section profile radial tire for heavy vehicles the cross-sectional configuration uninflated defined in a metal mold of which has an aspect ratio of smaller than 0.85 and a crown flatness of larger than 2.0 and which comprises a carcass formed by plies, a number of cords of which lie in a substantially radial plane, a belt formed by a plurality of inextensible layers and superimposed about said carcass and extending over substantially the total width of a crown of a tread portion of the tire, and a cushion rubber inserted between said carcass and belt, said tire constructed to satisfy the following conditions:

1. the thickness of the tread portion which extends along the crown region is substantially uniformly distributed over 35–60% of the maximum width of the inextensible layers which comprise a tension member of said belt,
2. said cushion rubber formed of a rubber stock triangular in cross section having a thickness arranged outside both sides of the center region of the crown, said cushion rubber gradually increasing the thickness of the tread portion toward the hump portion of the tire, and
3. the thickness of said cushion rubber limited to a range of 25–50% of the thickness of that tread portion which is located at the crown center position, the thickness of said cushion rubber being defined by a distance from the the end of the inextensible layer having the maximum width to the carcass, the distance being measured on a normal line which is drawn from the end of the inextensible layer having the maximum width perpendicular to the carcass ply.

2. A low section profile radial tire for heavy vehicles as claimed in claim 1, wherein the thickness of that tread portion which extends along the crown center region is substantially distributed over 45–55% of the maximum width of the inextensible layers which mainly consist of a tension member of said belt.

3. A low section profile radial tire for heavy vehicles as claimed in claim 1, wherein the thickness of said cushion rubber is 30% to 45% of the thickness of that tread portion which is located at the crown center position.

4. A low section profile radial tire for heavy vehicles as claimed in claim 1, wherein said cushion rubber comprises a material having a hardness which is lower than that of the tread rubber and the coating rubber of said carcass and belt, and said cushion rubber has a heat resistant property and shock absorbing property which are superior to those of the tread rubber and the coating rubber of said carcass and belt.

5. A low section profile flat radial tire for heavy vehicles as claimed in claim 1, wherein said cushion rubber is formed of rubber which is the same as the tread rubber and the coating rubber of said carcass and belt.

* * * * *